(12) United States Patent
Ramaswamy et al.

(10) Patent No.: US 11,470,527 B1
(45) Date of Patent: Oct. 11, 2022

(54) SYSTEMS AND METHODS FOR DEVICE-ASSISTED SEAMLESS TRANSFER BETWEEN EDGE COMPUTING SYSTEMS IN A WIRELESS NETWORK

(71) Applicant: Verizon Patent and Licensing Inc., Basking Ridge, NJ (US)

(72) Inventors: Karthik Ramaswamy, Coppell, TX (US); Darshan Gupta, Irving, TX (US); Sivanaga Ravi Kumar Chunduru Venkata, Irving, TX (US); Sharine M. Ali, Verona, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 37 days.

(21) Appl. No.: 17/208,230

(22) Filed: Mar. 22, 2021

(51) Int. Cl.
*H04W 36/18* (2009.01)
*H04W 36/32* (2009.01)
*H04W 36/00* (2009.01)
*H04W 36/22* (2009.01)

(52) U.S. Cl.
CPC ....... *H04W 36/18* (2013.01); *H04W 36/0033* (2013.01); *H04W 36/0072* (2013.01); *H04W 36/22* (2013.01); *H04W 36/32* (2013.01)

(58) Field of Classification Search
CPC ............. H04W 36/18; H04W 36/0033; H04W 36/0072; H04W 36/22; H04W 36/32
See application file for complete search history.

(56) References Cited

U.S. PATENT DOCUMENTS

| 2018/0242204 A1* | 8/2018 | Zhu ........................ H04W 76/11 |
| 2018/0263039 A1* | 9/2018 | Fang ................... H04W 72/0493 |
| 2021/0051762 A1* | 2/2021 | Young ................... H04W 36/12 |
| 2022/0015018 A1* | 1/2022 | Kim ................... H04W 36/0033 |

\* cited by examiner

*Primary Examiner* — Ashley Shivers

(57) ABSTRACT

A system described herein may provide a technique for the seamless transfer of services provided by a first Multi-Access/Mobile Edge Computing device ("MEC") to a User Equipment ("UE"), to a second MEC. Context information associated with a given application for which services are provided by the first MEC may be cached by the UE based on a determination that the second MEC should provide the services, and the UE may provide the cached information to the second MEC in order to seamlessly continue receiving services. The providing of the cached information to the UE and/or to the second MEC may be performed with an elevated priority level, in order to facilitate the seamless providing of the services relating to the application, thus resulting in minimal to no interruption of the user experience associated with the application.

20 Claims, 8 Drawing Sheets

SYSTEMS AND METHODS FOR DEVICE-ASSISTED SEAMLESS TRANSFER BETWEEN EDGE COMPUTING SYSTEMS IN A WIRELESS NETWORK

BACKGROUND

Wireless user equipment ("UE"), such as mobile telephones or other wireless communication devices, may communicate with application servers via a wireless network, which may include one or more radio access networks ("RANs"), such as a Long-Term Evolution ("LTE") RAN, a Fifth Generation ("5G") RAN, or some other type of RAN. Wireless networks may make use of Multi-Access/Mobile Edge Computing ("MEC") devices, referred to sometimes herein simply as "MECs," which may be located at geographically diverse locations within a given wireless network. MECs may perform computing for applications executing at UEs connected to the wireless network, such that traffic associated with such applications does not need to traverse a core of the wireless network and/or one or more external networks.

DETAILED DESCRIPTION OF EXAMPLE EMBODIMENTS

Figure 1:
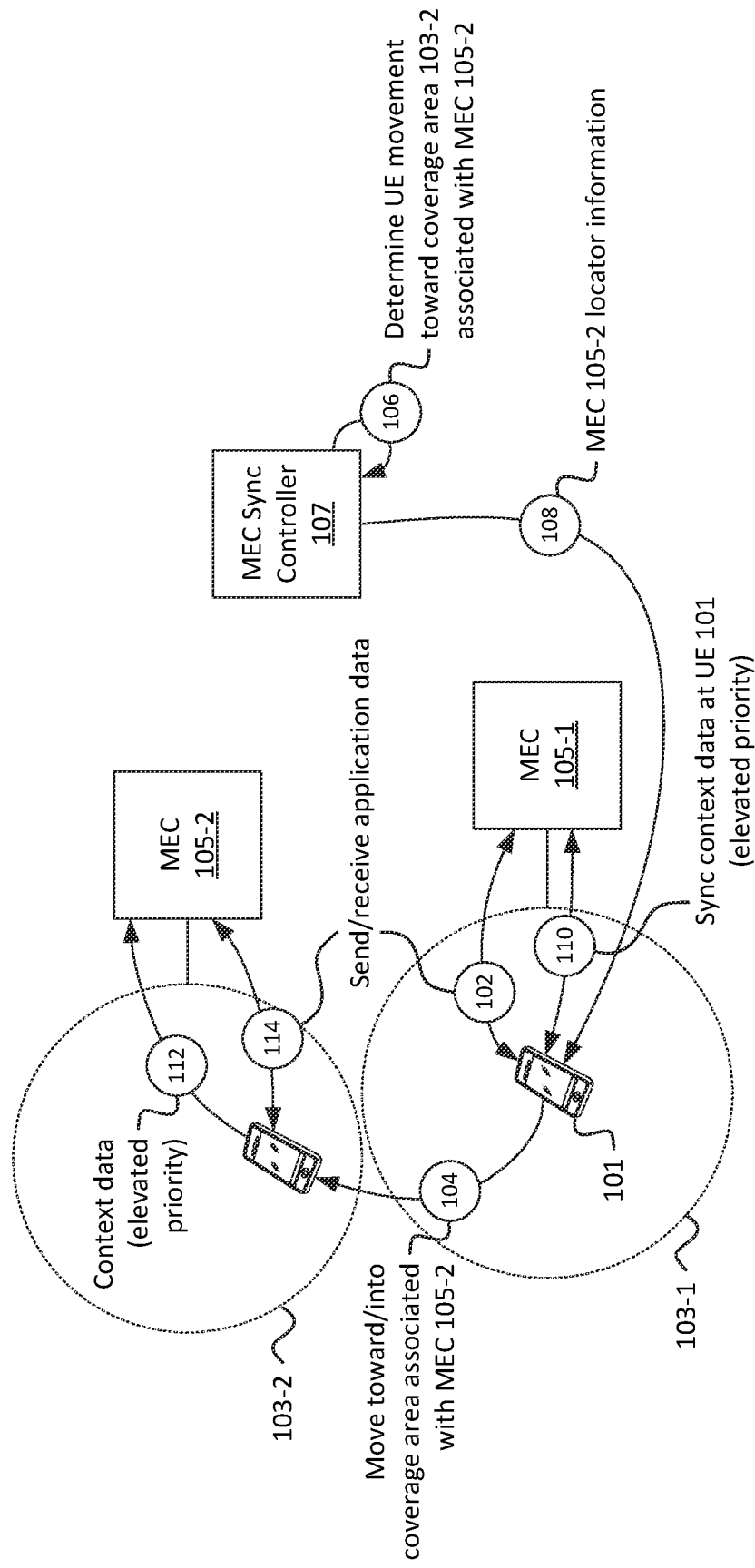
FIG. 1 illustrates an example overview of one or more embodiments described herein.

The following detailed description refers to the accompanying drawings. The same reference numbers in different drawings may identify the same or similar elements.

MECs may be geographically distributed devices or systems that perform computing, calculations, processing, and/or other operations associated with applications executing at one or more UEs, such as mobile phones, tablets, Machine-to-Machine ("M2M") devices, Internet of Things ("IoT") devices, autonomous vehicles, or the like. The performance of such computing, calculations, processing, etc. by MECs as opposed to "far cloud" resources such as Internet-accessible application servers or other types of resources may result in reduced latency and/or otherwise enhanced performance as compared to the use of "far cloud" resources for these operations.

In order to provide services to UEs (e.g., in relation to applications executed by the UEs), such as stateful services, MECs may maintain context data, application state data, etc. (referred to herein simply as "context data") based on which the MECs may perform computations, calculations, etc. related to such services. For example, for a MEC providing services related to autonomous driving, the MEC may maintain telemetry data received over a rolling time window from a given autonomous vehicle, based on which the MEC may determine output information such as throttle control parameters, brake control parameters, steering control parameters, or the like. As another example, for a MEC providing services related to an augmented reality ("AR") application, the MEC may maintain a buffer of audio and/or video information received from the UE over time, and may generate graphical overlays and/or other information to the UE to provide a suitable AR experience. As yet another example, for a MEC providing services related to a video game, the MEC may maintain a game state, such as level, lives remaining, location within a game world, and/or other suitable information, may generate output information (e.g., graphics, audio, haptic feedback, etc.) based on the game state, and may provide the output information to the UE.

In some situations, a new MEC (e.g., a "target" MEC) may be selected, assigned, etc. for a UE that is currently served by another MEC (e.g., a "source" MEC). For example, the UE may travel between different geographical regions that are served by different MECs, one MEC may offer better performance (e.g., lower latency, lower processing times, etc.) than another MEC, one MEC may be more loaded than another MEC, etc. In such situations, the target MEC may not have access to the context information associated with an application for which services are provided to the UE by the source MEC. Without such information, the target MEC may be unable to provide stateful services associated with the application to the UE.

As described herein, context information associated with a given application (or set of applications) for which services are provided by a MEC (e.g., a "source" MEC) to a UE may be cached by the UE based on a determination that the UE is moving to a geographical region serviced by a different MEC (e.g., a "target" MEC), and the UE may provide the cached information to the target MEC in order to seamlessly continue receiving services associated with the application. In some embodiments, the providing of the cached information to the UE (e.g., by the source MEC) and/or to the target MEC (e.g., by the UE) may be performed with an elevated priority level, in order to facilitate the seamless providing of the services relating to the application, thus resulting in minimal to no interruption of the user experience associated with the application.

As shown in FIG. 1, for example, UE 101 may be located within a first geographical region 103-1. In this example geographical region 103-1 may be associated with a first MEC 105-1, and geographical region 103-2 may be associated with a second MEC 105-2. For example, geographical region 103-1 may be served by a first base station of a RAN (e.g., an evolved Node B ("eNB"), a Next Generation Node B ("gNB"), and/or some other type of base station), and geographical region 103-2 may be served by a second base station of the RAN. Additionally, or alternatively, geographical region 103-1 may be a first sector associated with a particular base station, and geographical region 103-2 may be a second sector associated with the same base station. In some embodiments, MECs 105 may be associated with respective geographical regions 103 in some other suitable manner.

While illustrated in FIG. 1 as a mobile phone, as noted above, UE 101 may be, may include, and/or may be included as a component of one or more other devices or systems. For example, UE 101 may be, may include, and/or may be included as a component of an IoT device, an M2M device, an autonomous vehicle, and/or some other type of device with network communication capabilities.

As noted above, UE 101 may execute one or more network applications that communicate, via a RAN or some other suitable type of access network, with MEC 105-1. For example, as noted above, UE 101 may communicate with MEC 105-1 via a particular base station of a RAN with which MEC 105-1 is associated. Additionally, or alternatively, MEC sync controller 107 and/or one or more other devices or systems may have selected MEC 105-1, from a set of candidate MECs 105, based on a location of UE 101 within geographical region 103-1 associated with MEC 105-1, and/or based on one or more other criteria. MEC sync controller 107 may include, and/or may be communicatively coupled to, a device or system that receives location information associated with UE 101 (e.g., from UE 101 directly, from a base station to which UE 101 is connected, and/or from one or more other devices or systems) and selects a particular MEC 105 to provide services associated with applications executed by UE 101 based on the location of UE 101 and/or other factors.

Based on the location of UE 101 being within geographical region 103-1 associated with MEC 105-1, and/or based on one or more other factors, UE 101 may send and/or receive (at 102) application data associated with one or more applications executing at UE 101 and served by MEC 105-1. For example, UE 101 may send sensor data, such as recordings or measurements associated with one or more accelerometers, gyroscopes, photosensors, cameras, microphones, Light Detection and Ranging ("LIDAR") devices, barometers, particulate matter sensors, and/or other types of sensors, input devices, measurement devices, or the like to MEC 105-1. In some embodiments, the application data may include user input data, such as voice input, keyboard input, haptic input, etc. provided by one or more users to UE 101.

At some point while communications (at 102) between UE 101 and MEC 105-1 are ongoing, UE 101 may move (at 104) toward and/or into geographical region 103-2, associated with MEC 105-2. For example, UE 101 may be located in, may be installed in, etc. an autonomous vehicle traveling along a roadway. MEC sync controller 107 may determine (at 106) that UE 101 has moved into, or toward, geographical region 103-2, and that MEC 105-2 should be selected or assigned to provide services relating to the application executed by UE 101. Additionally, or alternatively, as discussed above, MEC sync controller 107 may select MEC 105-2 based on one or more other factors in addition to, or in lieu of, UE 101 moving into or toward geographical region 103-2.

Based on assigning, selecting, etc. MEC 105-2, MEC sync controller 107 may output (at 108) locator information associated with MEC 105-2 to UE 101. For example, as discussed below, UE 101 may implement one or more application programming interfaces ("APIs"), applications, or other suitable communication pathways via which UE 101 may communicate with MEC sync controller 107. The locator information may include an Internet Protocol ("IP") address of MEC 105-2, a hostname of MEC 105-2, an identifier of MEC 105-2, and/or some other information via which UE 101 may communicate with MEC 105-2. In some embodiments, MEC sync controller 107 may provide (at 108) an instruction to communicate with MEC 105-2 instead of with MEC 105-1, a MEC switch indication, and/or some other type of indication to prepare to communicate with MEC 105-2. In some embodiments, MEC sync controller 107 may provide (at 108) an authentication token or other type of security information, which may be used by UE 101 to facilitate a switch from communicating with MEC 105-1 to MEC 150-2 with an elevated priority (e.g., in a seamless fashion).

Based on receiving the locator information, MEC switch indication, etc., UE 101 may initiate (at 110) a sync of context data, associated with the application, with MEC 105-1. For example, MEC 105-1 may output (at 110) some or all context data, used by MEC 105-1 to perform computations or calculations, or to otherwise provide services related to the application, to UE 101. In some embodiments, UE 101 and/or MEC 105-1 may output a MEC switch indication to a base station and/or one or more other network devices.

Based on the MEC switch indication, the base station or the one or more other network devices may provide traffic, associated with the syncing of the context data to UE 101, with an elevated priority. For example, the base station may grant a relatively large amount of radio frequency ("RF") resources (e.g., Physical Resource Blocks ("PRBs")) and/or other resources to UE 101 in order to ensure a relatively fast transfer of the context data to UE 101. For example, the "relatively large amount" of resources may be an amount that is in excess of one or more Quality of Service ("QoS") policies, Service Level Agreements ("SLAs"), or the like, associated with UE 101 and/or the application. In some embodiments, the "relatively large amount" of resources may be, or maybe based on, a predetermined amount of resources that should be granted for syncing of context data used by MEC 105-1. Additionally, or alternatively, the base station and/or other network devices may increase a queue weight or priority associated with the traffic based on the MEC switch indication.

In some embodiments, MEC 105-1 may mark the traffic (e.g., include a flag in header information and/or some other type of indicator) with a MEC switch indication, indicating that the traffic is associated with a syncing of context data from MEC 105-1 to UE 101. Based on the MEC switch indication, the base station and/or other network devices may provide elevated priority to the traffic.

In some embodiments, the MEC switch indication may include the token or other authentication information provided by MEC sync controller 107. The base station or other network devices may validate the token prior to providing the elevated priority to the traffic. For example, the base station or other network devices may request and/or may have previously received the token from MEC sync controller 107, and may compare the tokens to determine a match. In case of a match, the base station or other network devices may validate the token included in the MEC switch indication, and may provide the elevated priority to the traffic.

Once UE 101 has received the context data (at 110), UE 101 may provide (at 112) the context data to target MEC 105-2. In some embodiments, UE 101 may cache some or all of the context data (e.g., in a local data storage device of UE 101) until the context data has been fully provided to target MEC 105-2. As similarly discussed above, UE 101 may output a MEC switch indication or other type of request to a base station associated with MEC 105-2 and/or geographical region 103-2, and/or may include the MEC switch indication in traffic (including the context data) sent to MEC 105-2, based on which the traffic may be treated with elevated priority.

Once MEC 105-2 has received the context data, MEC 105-2 may communicate (at 114) with UE 101 based on the received context data. For example, MEC 105-2 may "resume" providing services, associated with the application, that were previously provided by MEC 105-1. As noted above, such applications may include autonomous driving applications, AR applications, gaming applications, and/or other types of applications. Due to the caching of the context data by UE 101, the transfer from MEC 105-1 and/or to MEC 105-2, of the context data, may be faster than syncing the context data with a central device or system that is more distant from MECs 105-1 and 105-2 than UE 101 (e.g., in terms of geographical distance, latency, network hops, or other types of distance). Further, the elevated priority provided to such transfers over other types of traffic may ensure that the context data is not delayed in favor of other types of traffic. In this manner, even if communications between UE 101 and MECs 105-1 and/or 105-2 relating to application data (e.g., at 102 and/or 114) are subject to a particular set of priority rules (e.g., by which the may be lower priority traffic than traffic associated with other UEs), an exception may be made for the context data transfers (at 108 and/or 112).

Figure 2:
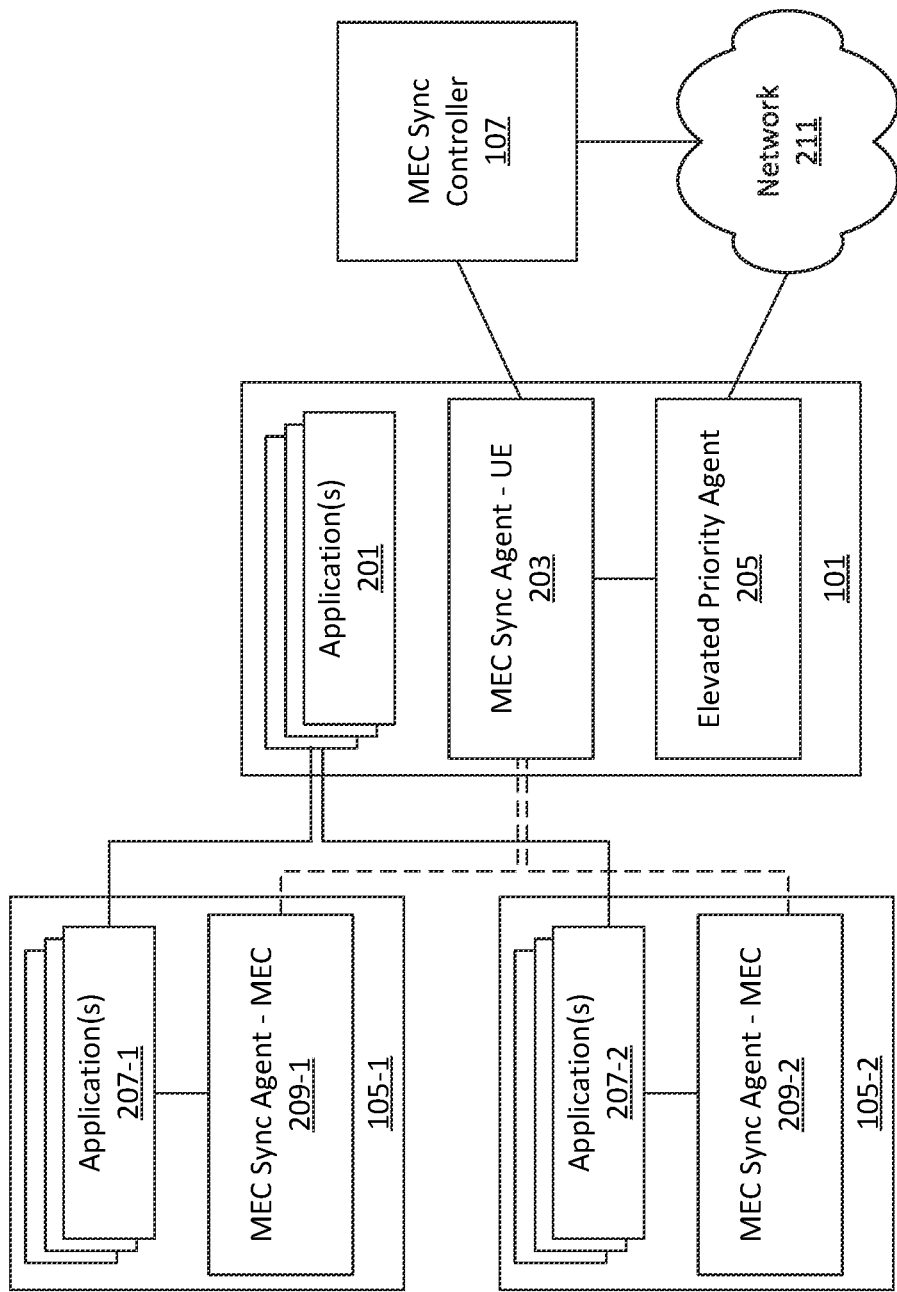
FIG. 2 illustrates example components of one or more devices or systems and their respective communication pathways, in accordance with one or more embodiments described herein.

FIG. 2 illustrates example components of UE 101, MECs 105-1 and/or 105-2, and MEC sync controller 107, in accordance with some embodiments. As shown, for example, UE 101 may be associated with a set of applications 201, MEC sync agent—UE 203, and elevated priority agent 205. Applications 201 may include one or more network applications that send and/or receive data to one or more device or systems via a network, such as a RAN. For example, applications 201 may receive user input, receive sensor data associated with one or more sensors of UE 101, and/or receive other information via UE 101, and may output some or all of the information to a given MEC (e.g., MEC 105-1 and/or MEC 105-2) via a RAN. Additionally, or alternatively, applications 201 may communicate with one or more other devices or systems (e.g., application servers and/or some other type of device or system) via the Internet and/or some other network.

Applications 201 may include "client-side" applications, while MECs 105-1 and/or 105-2 may execute "server-side" applications application 207-1 and 207-2, respectively. For example, a particular application 201 may receive user input via UE 101, and may provide the user input (and/or information derived from or generated based on the user input) to an associated application 207-1 and/or 207-2, which may perform computations, calculations, etc. (as described above) based on the received input, and may provide output (e.g., application traffic) to application 201. In turn, application 201 may present output information (e.g., graphics, sound, haptic feedback, etc.) based on the information received from application 207-1 and/or 207-2.

MEC sync agent—UE 203 may communicate with MEC sync controller 107 via an API or other suitable communication pathway. In some embodiments, MEC sync agent—UE 203 may communicate with MEC sync controller 107 via the Internet and/or some other suitable network. As noted above, MEC sync controller 107 may monitor a location of UE 101 and/or one or more other factors. Based on the location and/or other factors, MEC sync controller 107 may select a particular MEC 105 to provide services to UE 101 (e.g., which particular MEC 105, out of a candidate set of MECs 105, should implement a particular application 207 to communicate with a particular application 201 executing on UE 101). MEC sync controller 107 may provide information to MEC sync agent—UE 203, indicating a particular MEC 105 with which UE 101 should communicate with (e.g., to which a network layer, operating system, and/or other suitable component of UE 101 should route traffic associated with one or more applications 201). As noted above, the information may include an IP address, a Uniform Resource Locator ("URL"), a Uniform Resource Identifier ("URI"), a hostname, a MEC identifier, or other suitable locator for a particular selected MEC 105. For example, in instances where UE 101 (e.g., applications 201) are presently communicating with applications 207-1 of MEC 105-1, MEC sync controller 107 may output information to MEC sync agent—UE 203, indicating that UE 101 should communicate with MEC 105-2 (e.g., applications 207-2) in lieu of MEC 105-1. In some embodiments, MEC sync controller 107 may provide such information with conditions, such as a condition that if UE 101 enters a particular geographical region, a coverage area associated with a particular base station, and/or other conditions, then UE 101 should communicate with MEC 105-2 instead of with MEC 105-1.

MEC sync agent—UE 203 may also communicate with respective MEC sync agents—MEC 209-1 and/or MEC sync agent—MEC 209-2, associated with MECs 105-1 and 105-2, respectively. For example, in the example where MEC sync controller 107 instructs MEC sync agent—UE 203 to switch from MEC 105-1 to MEC 105-2, MEC sync agent—UE 203 may output a request for sync information (e.g., application context information associated with one or more applications 207-1) to MEC sync agent—MEC 209-1, and MEC sync agent—MEC 209-1 may provide the requested context information to MEC sync agent—UE 203. MEC sync agent—UE 203 may store, cache, buffer, etc. the received sync information. Further, MEC sync agent—UE 203 may provide the context information to MEC sync agent—MEC 209-2, which may provide the context information to one or more applications 207-2.

Further, MEC sync agent—UE 203 may provide information regarding the communications with MECs 105-1 and 105-2 (e.g., the transfer of the context information from MEC 105-1 and/or to MEC 105-2) to elevated priority agent 205. For example, MEC sync agent—UE 203 may insert header information (e.g., a flag, a marking, a label, etc.) indicating that the traffic is associated with a context transfer, and may provide the flag, marking, etc. to elevated priority agent 205. Elevated priority agent 205 may communicate with one or more elements of network 211, in order to receive elevated priority treatment of the traffic sent between MEC sync agent—UE 203 and MEC sync agents—MEC 209-1 and/or 209-2. For example, elevated priority agent 205 may communicate with a base station of a RAN to which UE 101 is connected and/or one or more other components of network 211, which may prioritize traffic with the indicated flag, marking, etc. Such prioritization may be different from a priority level associated with UE 101 and/or applications 201. In other words, application traffic associated with applications 201 may be prioritized different from context transfer traffic associated with MEC sync agent—UE 203 and MEC sync agents—MEC 209-1 and/or 209-2, thus providing a seamless experience when switching from one MEC 105 to another.

Figure 3:
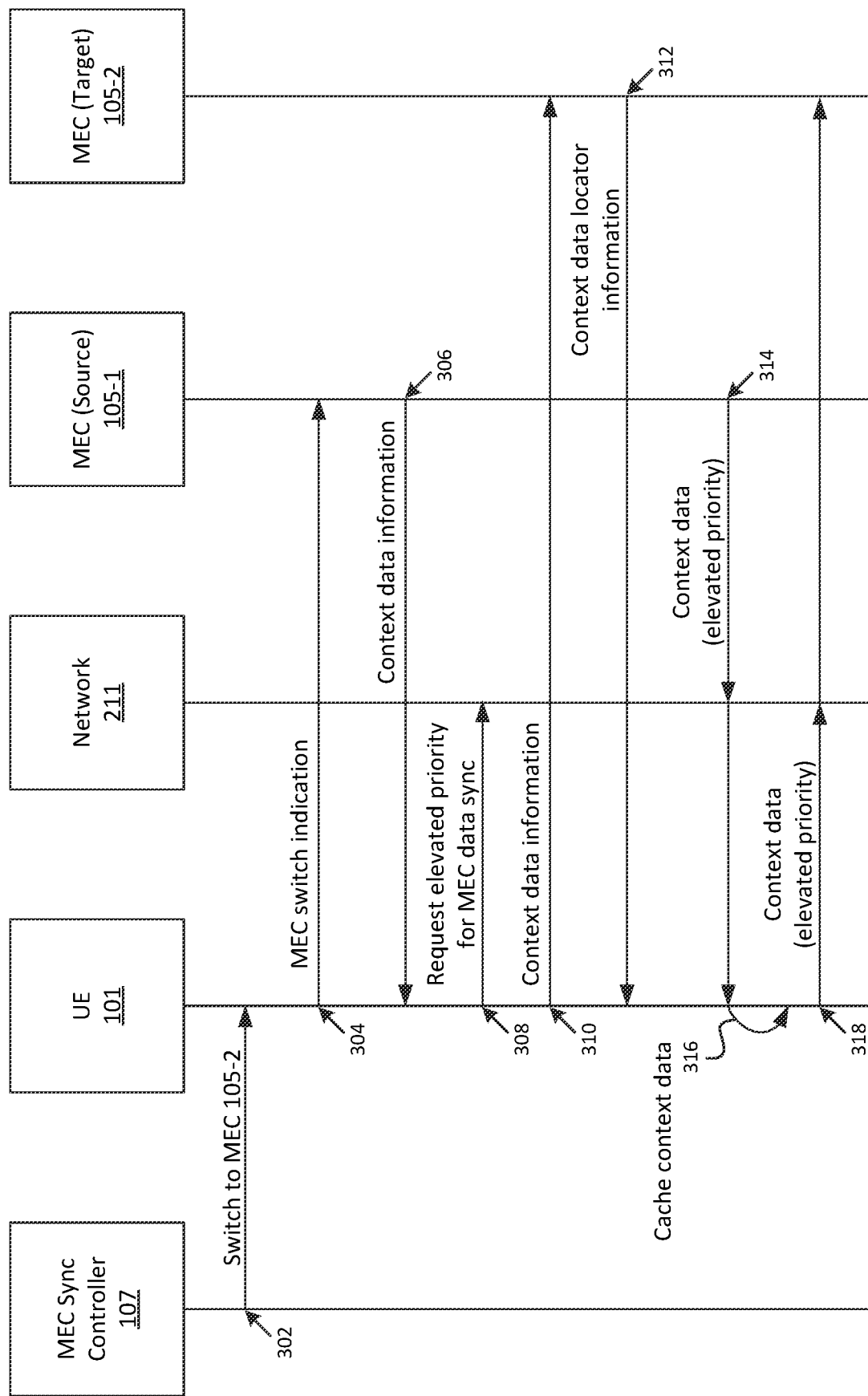
FIG. 3 illustrates an example signal flow that may be used for a seamless transfer between MECs, in accordance with some embodiments.

FIG. 3 illustrates an example signal flow that may be used for a seamless transfer between MECs, in accordance with some embodiments. As shown, for example, UE 101 (e.g., MEC sync agent—UE 203) may receive (at 302) in indication to switch to MEC 105-2. As noted above, this indication may include an IP address, a URL, and/or other suitable identifier of MEC 105-2, which UE 101 may use to communicate with MEC 105-2. Based on receiving (at 302) the indication to switch to MEC 105-2, UE 101 (e.g., MEC sync agent—UE 203) may output (at 304) a MEC switch indication to MEC 105-1, with which UE 101 (e.g., one or more applications 201) is currently in communication.

MEC 105-1 may output (at 306) context data information, associated with one or more applications 201, to UE 101. The context data information may include a size or amount of context data, a location or address associated with MEC 105-1 from which UE 101 may access the context data, and/or other descriptors of the context data. UE 101 (e.g., elevated priority agent 205) may communicate (e.g., via a control channel or other suitable interface) with one or more devices or systems associated with network 211, in order to request (at 308) elevated priority for a MEC data sync (e.g., the transferring of context information from MEC 105-1 to UE 101, and from UE 101 to MEC 105-2). As noted above, the request (at 308) may include information that network 211 may use to identify the transfer of the context information, such as one or more flags, labels, etc.

UE 101 may also provide (at 310) information regarding the context data, such as size, file type(s), application identifiers, or the like, to MEC 105-2. MEC 105-2 may, in some embodiments, provision, free up, etc. storage space to accommodate the context data, and/or may instantiate, install, provision, etc. one or more applications 207 with which the context data is associated. MEC 105-2 may provide (at 312) locator information, such as an IP address, a URL, directory information, or other suitable information which may be used by UE 101 (e.g., MEC sync agent—UE 203) to provide the context information once received.

UE 101 may further receive (at 314) the context data from MEC 105-1. For example, UE 101 may output a confirmation to MEC 105-1 after receiving (at 312) locator information from MEC 105-2, based on which MEC 105-1 may output (at 314) the context data to UE 101. In some embodiments, MEC 105-1 may output (at 314) the context data to UE 101 independent of any such confirmation from UE 101. The context data may be provided (at 314) via a RAN associated with UE 101 and/or MEC 105-1, and may be provided with elevated priority based on the request (at 308) provided by UE 101. For example, a base station associated with network 211 may provide extra PRBs for the context data, may increase a queue weight associated the context data, and/or otherwise prioritize the context data (e.g., allot a higher priority than application traffic associated with UE 101 and MEC 105-1).

UE 101 may cache (at 316) the received context data, and may provide (at 318) the context data to MEC 105-2 (e.g., MEC sync agent—MEC 209-2). For example, UE 101 may use the context data locator information provided (at 312) by MEC 105-2. As similarly noted above, the context data may be provided (at 318) with elevated priority, to ensure a seamless transfer of services between MEC 105-1 and 105-2.

Figure 4:
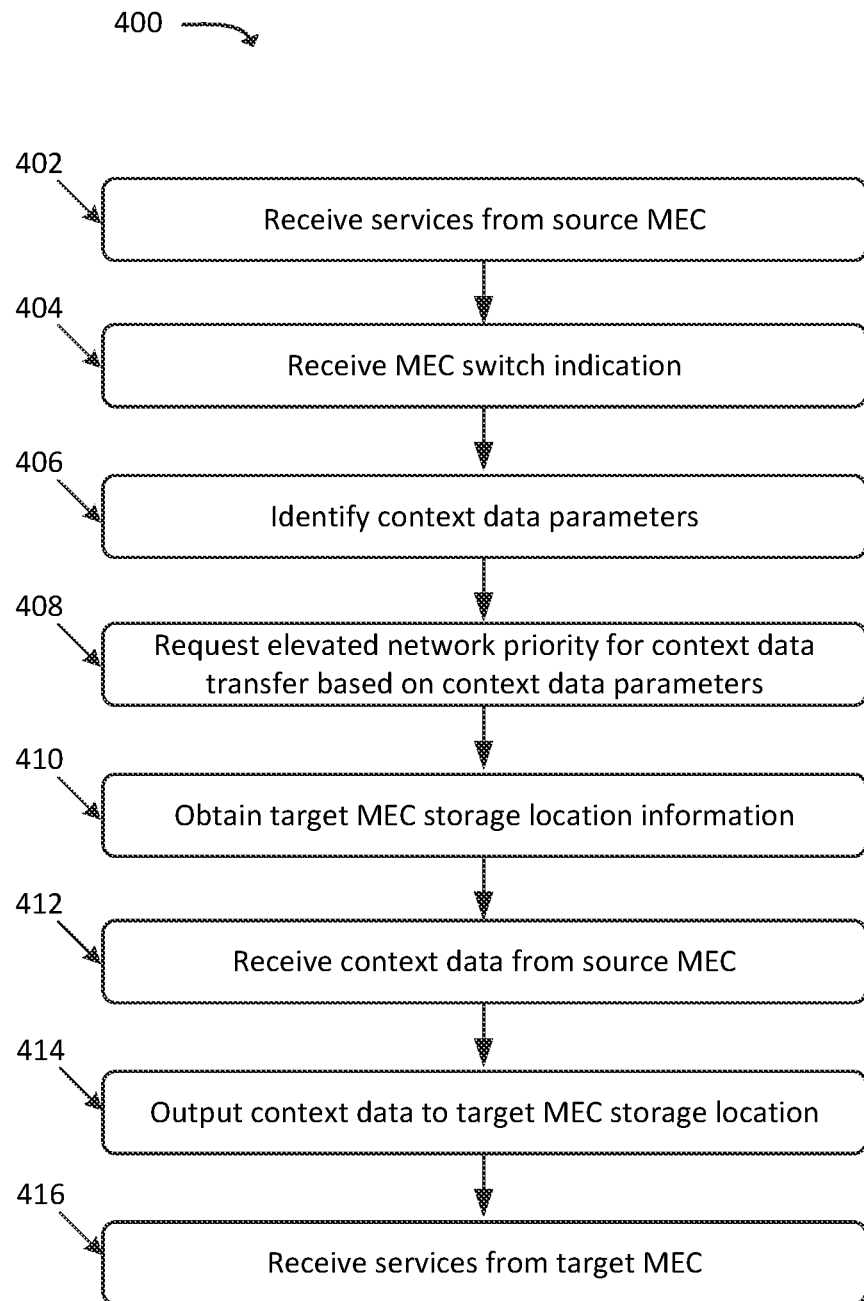
FIG. 4 illustrates an example process for a seamless transfer between MECs, in accordance with some embodiments.

FIG. 4 illustrates an example process 400 for a seamless transfer between MECs 105, in accordance with some embodiments. In some embodiments, some or all of process 400 may be performed by UE 101 (e.g., by MEC sync agent—UE 203 and/or elevated priority agent 205). In some embodiments, one or more other devices may perform some or all of process 400 (e.g., in concert with, and/or in lieu of, UE 101).

As shown, process 400 may include receiving (at 402) services from a source MEC. For example, UE 101 may communicate with a first MEC 105-1, which may execute one or more "server side" applications 207 that communicate with one or more "client side" applications 201 executing at UE 101.

Process 400 may further include receiving (at 404) a MEC switch indication. For example, UE 101 may receive the MEC switch indication from MEC sync controller 107. For example, MEC sync controller 107 may have determined, based on a geographical location of UE 101 and/or one or more other factors, that UE 101 should communicate with a second MEC 105-2 (e.g., a "target" MEC).

Process 400 may further include identifying (at 406) context data parameters associated with the one or more applications 207 executing at MEC 105-1. For example, UE 101 may request information regarding a size of the context data associated with applications 207, file types of the context data, and/or other suitable parameters. As noted above, UE 101 (e.g., MEC sync agent—UE 203) may request such information from MEC 105-1 (e.g., MEC sync agent—MEC 209-1 associated with MEC 105-1).

Process 400 may additionally include requesting (at 408) elevated network priority for a transfer of the context data based on the context data parameters. For example, UE 101 (e.g., elevated priority agent 205) may output a request to a base station to which UE 101 is connected and/or to some other network element, indicating the size, file type(s), flags and/or labels, and/or other parameters associated with the transfer of the context data to UE 101 (e.g., from MEC 105-1) and/or from UE 101 (e.g., to MEC 105-2).

Process 400 may also include obtaining (at 410) storage location information associated with MEC 105-2. For example, UE 101 (e.g., MEC sync agent—UE 203) may communicate with MEC 105-2 (e.g., MEC sync agent—MEC 209-2) to identify an IP address, a URL, and/or other information that may be used by UE 101 to provide the context associated with applications 207-1 executing at MEC 105-1 (e.g.,"server side" applications 207 associated with one or more "client side" applications 201 executing at UE 101). In some embodiments, the storage location may include one or more storage devices implemented by the same set of hardware as MEC 105-2 (e.g., the same data center, the same server or server racks, the same cloud computing system, etc.).

Process 400 may further include receiving (at 412) context data from MEC 105-1. For example, UE 101 may output a request for the context data (e.g., after receiving the storage location information from MEC 105-2 and/or at some other time). In some embodiments, MEC 105-1 may provide the context data after receiving (at 406) a request for context data parameters and/or at some other time that is independent of UE 101 receiving the storage location information from MEC 105-2. As noted above, traffic associated with the context data may be treated with elevated priority by one or more network elements via which the traffic is provided, based on the request (at 408) for elevated network priority for the context data transfer.

Process 400 may additionally include outputting (at 414) the context data to the storage location associated with MEC 105-2. For example, UE 101 may output the context data (received at 412) to the storage location (e.g., as indicated at 410) associated with MEC 105-2. MEC 105-2 may instantiate, activate, etc. one or more instances of applications 207, with which the context data is associated with, based on receiving the context data (at 414) and/or based on receiving some other indication of the transfer (e.g., the request at 410 for the storage location information associated with MEC 105-2). As noted above, traffic associated with the context data may be treated with elevated priority by one or more network elements via which the traffic is provided, based on the request (at 408) for elevated network priority for the context data transfer.

Process 400 may also include receiving services (at 416) from MEC 105-2. For example, MEC 105-2 may "resume" operations, via applications 207-2, that were previously performed by applications 207-1 associated with MEC 105-1, using the context data provided by UE 101. In this manner, UE 101 may receive a "seamless" experience of the network applications 201 executing on UE 101, with minimal or no disruption of MEC-provided services for applications 201 (e.g., as provided by MECs 105-1 and 105-2).

Figure 5:
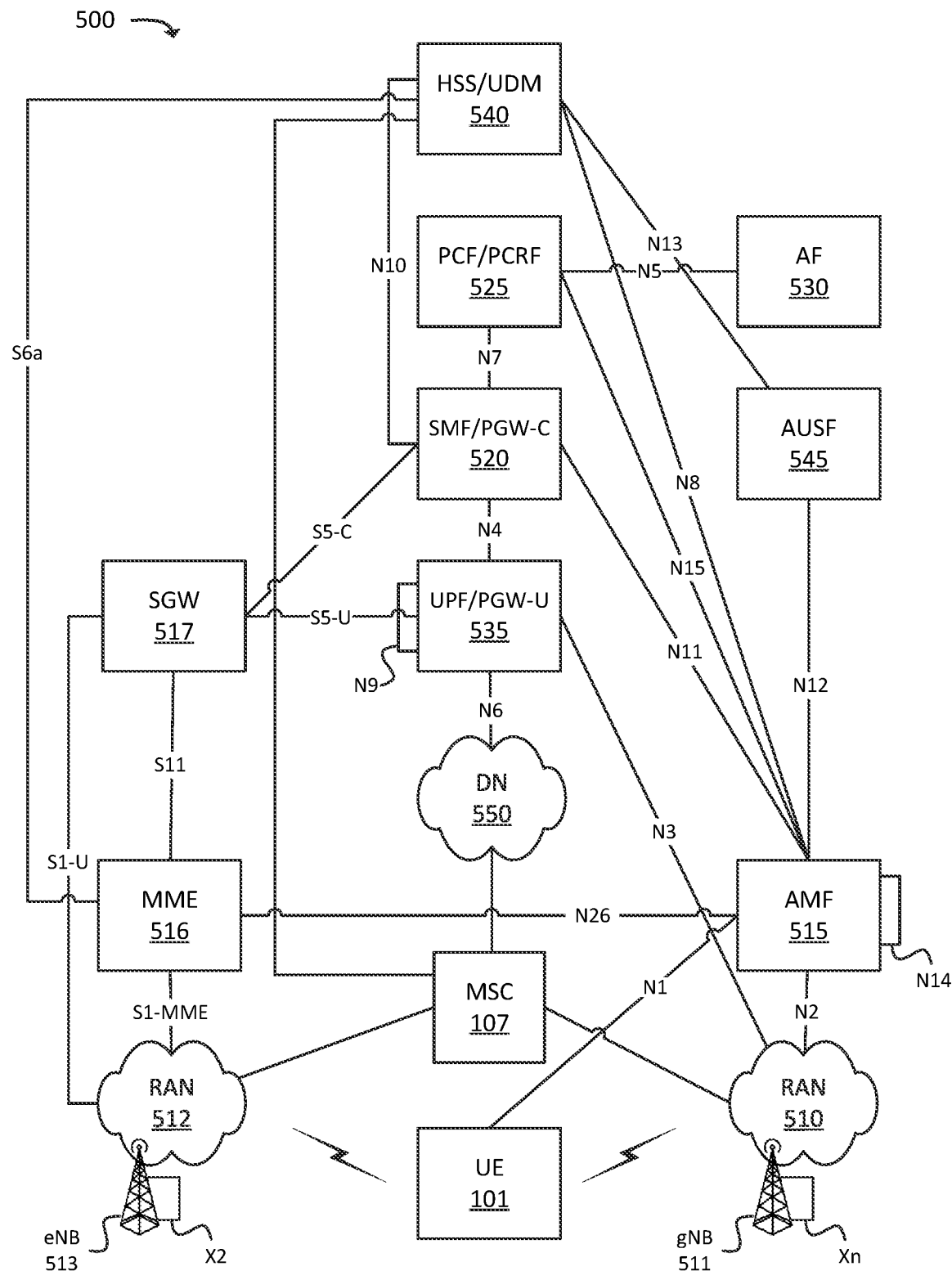
FIG. 5 illustrates an example environment in which one or more embodiments, described herein, may be implemented.

FIG. 5 illustrates an example environment 500, in which one or more embodiments may be implemented. In some embodiments, environment 500 may correspond to a 5G network, and/or may include elements of a 5G network. In some embodiments, environment 500 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 500 may include UE 101, RAN 510 (which may include one or more Next Generation Node Bs ("gNBs") 511), RAN 512 (which may include one or more one or more evolved Node Bs ("eNBs") 513), and various network functions such as Access and Mobility Management Function ("AMF") 515, Mobility Management Entity ("MME") 516, Serving Gateway ("SGW") 517, Session Management Function ("SMF")/Packet Data Network ("PDN") Gateway ("PGW")—Control plane function ("PGW-C") 520, Policy Control Function ("PCF")/Policy Charging and Rules Function ("PCRF") 525, Application Function ("AF") 530, User Plane Function ("UPF")/PGW—User plane function ("PGW-U") 535, Home Subscriber Server ("HSS")/Unified Data Management ("UDM") 540, and Authentication Server Function ("AUSF") 545. Environment 500 may also include one or more networks, such as Data Network ("DN") 550. Environment 500 may include one or more additional devices or systems communicatively coupled to one or more networks (e.g., DN 550), such as MEC sync controller 107.

The example shown in FIG. 5 illustrates one instance of each network component or function (e.g., one instance of SMF/PGW-C 520, PCF/PCRF 525, UPF/PGW-U 535, HSS/UDM 540, and/or 545). In practice, environment 500 may include multiple instances of such components or functions. For example, in some embodiments, environment 500 may include multiple "slices" of a core network, where each slice includes a discrete set of network functions (e.g., one slice may include a first instance of SMF/PGW-C 520, PCF/PCRF 525, UPF/PGW-U 535, HSS/UDM 540, and/or 545, while another slice may include a second instance of SMF/PGW-C 520, PCF/PCRF 525, UPF/PGW-U 535, HSS/UDM 540, and/or 545). The different slices may provide differentiated levels of service, such as service in accordance with different Quality of Service ("QoS") parameters.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more network functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 101 may include a computation and communication device, such as a wireless mobile communication device that is capable of communicating with RAN 510, RAN 512, and/or DN 550. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an IoT device, M2M device, or another type of mobile computation and communication device. UE 101 may send traffic to and/or receive traffic (e.g., user plane traffic) from DN 550 via RAN 510, RAN 512, and/or UPF/PGW-U 535.

RAN 510 may be, or may include, a 5G RAN that includes one or more base stations (e.g., one or more gNBs 511), via which UE 101 may communicate with one or more other elements of environment 500. UE 101 may communicate with RAN 510 via an air interface (e.g., as provided by gNB 511). For instance, RAN 510 may receive traffic (e.g., voice call traffic, data traffic, messaging traffic, signaling traffic, etc.) from UE 101 via the air interface, and may communicate the traffic to UPF/PGW-U 535, and/or one or more other devices or networks. Similarly, RAN 510 may receive traffic intended for UE 101 (e.g., from UPF/PGW-U 535, AMF 515, and/or one or more other devices or networks) and may communicate the traffic to UE 101 via the air interface.

RAN 512 may be, or may include, a LTE RAN that includes one or more base stations (e.g., one or more eNBs 513), via which UE 101 may communicate with one or more other elements of environment 500. UE 101 may communicate with RAN 512 via an air interface (e.g., as provided by eNB 513). For instance, RAN 510 may receive traffic (e.g., voice call traffic, data traffic, messaging traffic, signaling traffic, etc.) from UE 101 via the air interface, and may communicate the traffic to UPF/PGW-U 535, and/or one or more other devices or networks. Similarly, RAN 510 may receive traffic intended for UE 101 (e.g., from UPF/PGW-U 535, SGW 517, and/or one or more other devices or networks) and may communicate the traffic to UE 101 via the air interface.

AMF 515 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 510 and/or gNBs 511, and/or to perform other operations. In some embodiments, the 5G network may include multiple AMFs 515, which communicate with each other via the N14 interface (denoted in FIG. 5 by the line marked "N14" originating and terminating at AMF 515).

MME 516 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 512 and/or eNBs 513, and/or to perform other operations.

SGW 517 may include one or more devices, systems, VNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, etc., that gather, process, store, and/or provide information in a manner described herein. SMF/PGW-C 520 may, for example, facilitate in the establishment of communication sessions on behalf of UE 101. In some embodiments, the establishment of communications sessions may be performed in accordance with one or more policies provided by PCF/PCRF 525.

PCF/PCRF 525 may include one or more devices, systems, VNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, etc., that receive, store, and/or provide information that may be used in determining parameters (e.g., quality of service parameters, charging parameters, or the like) for certain applications.

UPF/PGW-U 535 may include one or more devices, systems, VNFs, etc., that receive, store, and/or provide data (e.g., user plane data). For example, UPF/PGW-U 535 may receive user plane data (e.g., voice call traffic, data traffic, etc.), destined for UE 101, from DN 550, and may forward the user plane data toward UE 101 (e.g., via RAN 510, SMF/PGW-C 520, and/or one or more other devices). In some embodiments, multiple UPFs 535 may be deployed (e.g., in different geographical locations), and the delivery of content to UE 101 may be coordinated via the N9 interface (e.g., as denoted in FIG. 5 by the line marked "N9" originating and terminating at UPF/PGW-U 535). Similarly, UPF/PGW-U 535 may receive traffic from UE 101 (e.g., via RAN 510, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

HSS/UDM 540 and AUSF 545 may include one or more devices, systems, VNFs, etc., that manage, update, and/or store, in one or more memory devices associated with AUSF 545 and/or HSS/UDM 540, profile information associated with a subscriber. AUSF 545 and/or HSS/UDM 540 may perform authentication, authorization, and/or accounting operations associated with the subscriber and/or a communication session with UE 101.

DN 550 may include one or more wired and/or wireless networks. For example, DN 550 may include an IP-based PDN, a wide area network ("WAN") such as the Internet, a private enterprise network, and/or one or more other networks. UE 101 may communicate, through DN 550, with data servers, other UEs 101, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 101 may communicate.

MEC sync controller 107 may receive, monitor, maintain, etc. information regarding geographical locations of one or more UEs 501 and/or MECs 105. For example, MEC sync controller 107 may receive such information via a Service Capability Exposure Function ("SCEF"), a Network Exposure Function ("NEF"), or other suitable network element. In some embodiments, MEC sync controller 107 may select a particular MEC 105 to provide services to UE 101 based on the geographical location of UE 101 (e.g., proximity to a particular MEC 105) and/or other suitable factors (e.g., network and/or processing load of MECs 105, applications associated with MECs 105, processing power associated with MECs 105, and/or other suitable factors). MEC sync controller 107 may output an indication to UE 101 (e.g., via DN 550, RAN 510, RAN 512, and/or some other suitable communication pathway) to switch to a particular MEC 501 based on a determination that UE 101 has moved into a coverage area associated with the particular MEC 501 and/or based on other factors.

Figure 6:
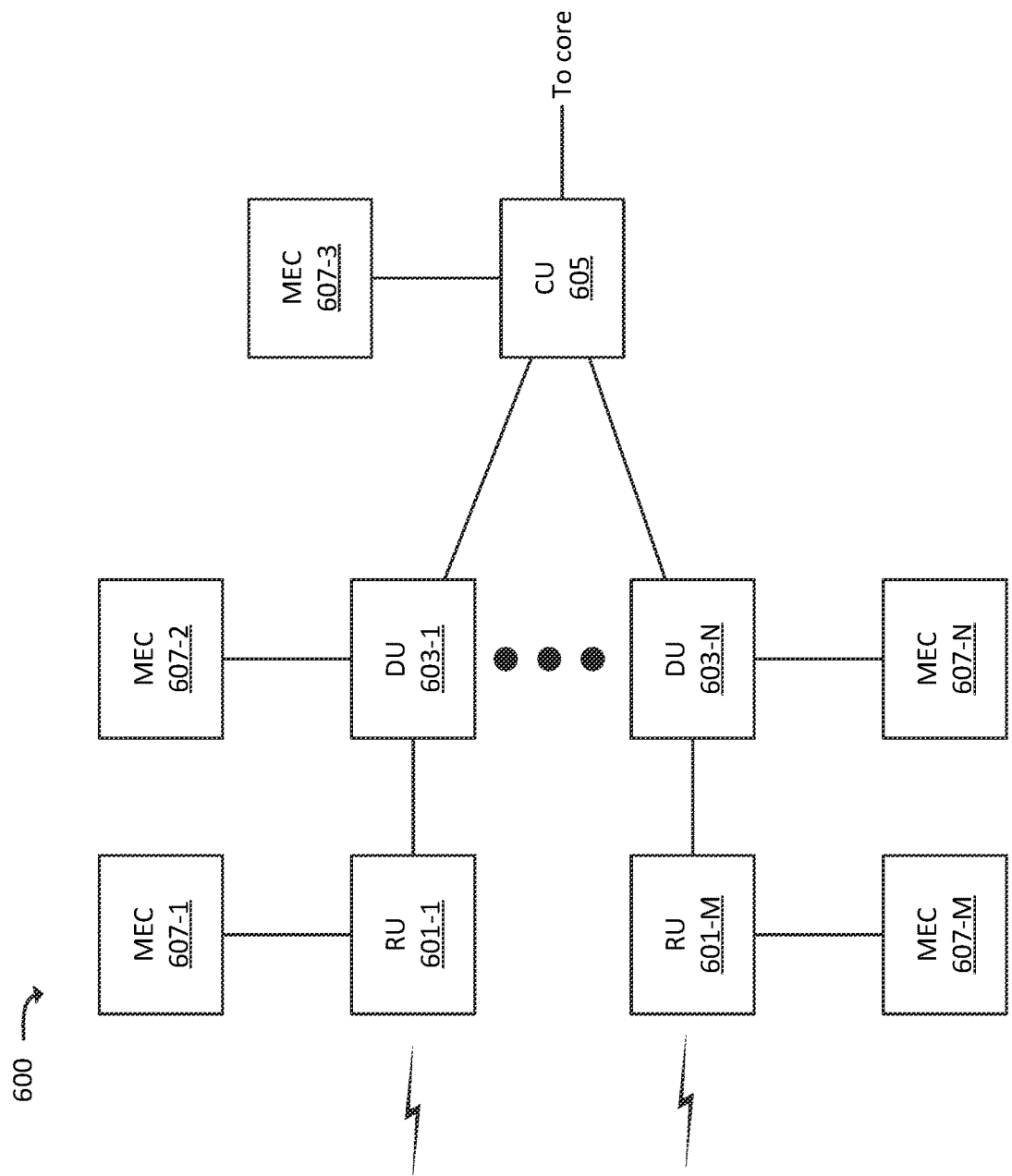
FIG. 6 illustrates an example arrangement of a RAN, in accordance with some embodiments.

FIG. 6 illustrates an example Distributed Unit ("DU") network 600, which may be included in and/or implemented by one or more RANs (e.g., RAN 510, RAN 512, or some other RAN). In some embodiments, a particular RAN may include one DU network 600. In some embodiments, a particular RAN may include multiple DU networks 600. In some embodiments, DU network 600 may correspond to a particular gNB 511 of a 5G RAN (e.g., RAN 510). In some embodiments, DU network 600 may correspond to multiple gNBs 511. In some embodiments, DU network 600 may correspond to one or more other types of base stations of one or more other types of RANs. As shown, DU network 600 may include Central Unit ("CU") 605, one or more Distributed Units ("DUs") 603-1 through 603-N (referred to individually as "DU 603," or collectively as "DUs 603"), and one or more Radio Units ("RUs") 601-1 through 601-M (referred to individually as "RU 601," or collectively as "RUs 601").

CU 605 may communicate with a core of a wireless network (e.g., may communicate with one or more of the devices or systems described above with respect to FIG. 5, such as AMF 515 and/or UPF/PGW-U 535). In the uplink direction (e.g., for traffic from UEs 101 to a core network), CU 605 may aggregate traffic from DUs 603, and forward the aggregated traffic to the core network. In some embodiments, CU 605 may receive traffic according to a given protocol (e.g., Radio Link Control ("RLC")) from DUs 603, and may perform higher-layer processing (e.g., may aggregate/process RLC packets and generate Packet Data Convergence Protocol ("PDCP") packets based on the RLC packets) on the traffic received from DUs 603.

In accordance with some embodiments, CU 605 may receive downlink traffic (e.g., traffic from the core network) for a particular UE 101, and may determine which DU(s) 603 should receive the downlink traffic. DU 603 may include one or more devices that transmit traffic between a core network (e.g., via CU 605) and UE 101 (e.g., via a respective RU 601). DU 603 may, for example, receive traffic from RU 601 at a first layer (e.g., physical ("PHY") layer traffic, or lower PHY layer traffic), and may process/aggregate the traffic to a second layer (e.g., upper PHY and/or RLC). DU 603 may receive traffic from CU 605 at the second layer, may process the traffic to the first layer, and provide the processed traffic to a respective RU 601 for transmission to UE 101.

RU 601 may include hardware circuitry (e.g., one or more RF transceivers, antennas, radios, and/or other suitable hardware) to communicate wirelessly (e.g., via an RF interface) with one or more UEs 101, one or more other DUs 603 (e.g., via RUs 601 associated with DUs 603), and/or any other suitable type of device. In the uplink direction, RU 601 may receive traffic from UE 101 and/or another DU 603 via the RF interface and may provide the traffic to DU 603. In the downlink direction, RU 601 may receive traffic from DU 603, and may provide the traffic to UE 101 and/or another DU 603.

RUs 601 may, in some embodiments, be communicatively coupled to one or more MECs 105. For example, RU 601-1 may be communicatively coupled to MEC 105-1, RU 601-M may be communicatively coupled to MEC 105-M, DU 603-1 may be communicatively coupled to MEC 105-2, DU 603-N may be communicatively coupled to MEC 105-N, CU 605 may be communicatively coupled to MEC 105-3, and so on. MECs 105 may include hardware resources (e.g., configurable or provisionable hardware resources) that may be configured to provide services and/or otherwise process traffic to and/or from UE 101, via a respective RU 601.

As noted above, MECs 105 may provide services to one or more UEs 101, such as by executing one or more applications 207 (e.g., "server side" applications). Further, MECs 105 may implement one or more instances of MEC sync agent—MEC 209, via which MECs 105 may participate in seamless transfers of context data associated with applications 207 and one or more UEs 101 (e.g., "client side" applications 201 executed by UEs 101).

For example, RU 601-1 may route some traffic, from UE 101, to MEC 105-1 instead of to a core network (e.g., via DU 603 and CU 605). MEC 105-1 may process the traffic, perform one or more computations based on the received traffic, and may provide traffic to UE 101 via RU 601-1. In this manner, ultra-low latency services may be provided to UE 101, as traffic does not need to traverse DU 603, CU 605, and an intervening backhaul network between DU network 600 and the core network.

Figure 7:
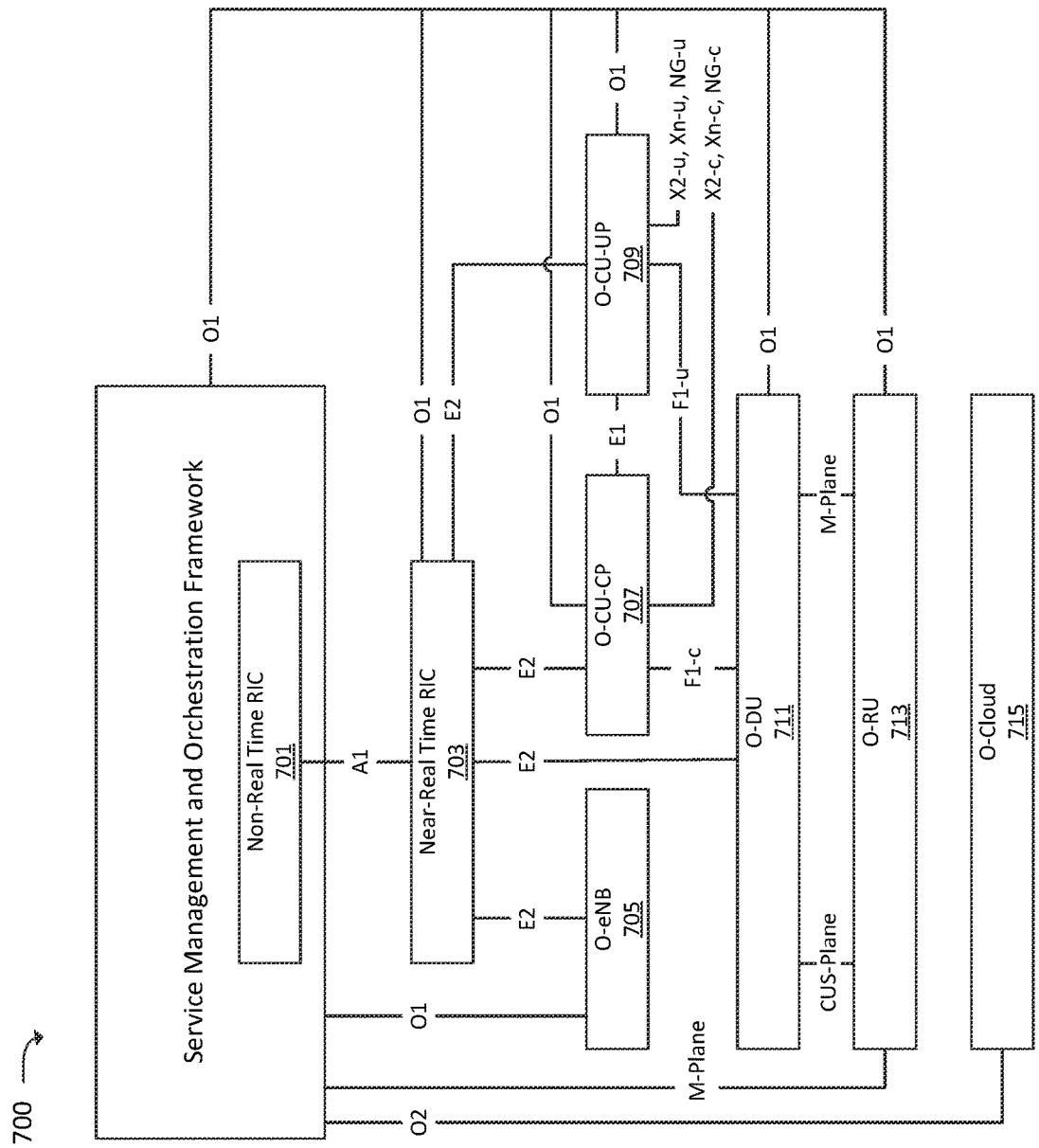
FIG. 7 illustrates an example arrangement of an Open RAN ("O-RAN") environment in which one or more embodiments, described herein, may be implemented.

FIG. 7 illustrates an example O-RAN environment 700, which may correspond to RAN 510, RAN 512, and/or DU network 600. For example, RAN 510, RAN 512, and/or DU network 600 may include one or more instances of O-RAN environment 700, and/or one or more instances of O-RAN environment 700 may implement RAN 510, RAN 512, DU network 600, and/or some portion thereof. As shown, O-RAN environment 700 may include Non-Real Time Radio Intelligent Controller ("RIC") 701, Near-Real Time RIC 703, O-eNB 705, O-CU-Control Plane ("O-CU-CP") 707, O-CU-User Plane ("O-CU-UP") 709, O-DU 711, O-RU 713, and O-Cloud 715. In some embodiments, O-RAN environment 700 may include additional, fewer, different, and/or differently arranged components.

In some embodiments, some or all of the elements of O-RAN environment 700 may be implemented by one or more configurable or provisionable resources, such as virtual machines, cloud computing systems, physical servers, and/or other types of configurable or provisionable resources. In some embodiments, some or all of O-RAN environment 700 may be implemented by, and/or communicatively coupled to, one or more MECs 105.

Non-Real Time RIC 701 and Near-Real Time RIC 703 may receive performance information (and/or other types of information) from one or more sources, and may configure other elements of O-RAN environment 700 based on such performance or other information. For example, Near-Real Time RIC 703 may receive performance information, via one or more E2 interfaces, from O-eNB 705, O-CU-CP 707, and/or O-CU-UP 709, and may modify parameters associated with O-eNB 705, O-CU-CP 707, and/or O-CU-UP 709 based on such performance information. Similarly, Non-Real Time RIC 701 may receive performance information associated with O-eNB 705, O-CU-CP 707, O-CU-UP 709, and/or one or more other elements of O-RAN environment 700 and may utilize machine learning and/or other higher level computing or processing to determine modifications to the configuration of O-eNB 705, O-CU-CP 707, O-CU-UP 709, and/or other elements of O-RAN environment 700. In some embodiments, Non-Real Time RIC 701 may generate machine learning models based on performance information associated with O-RAN environment 700 or other sources, and may provide such models to Near-Real Time RIC 703 for implementation.

O-eNB 705 may perform functions similar to those described above with respect to eNB 513. For example, O-eNB 705 may facilitate wireless communications between UE 101 and a core network. O-CU-CP 707 may perform control plane signaling to coordinate the aggregation and/or distribution of traffic via one or more DUs 603, which may include and/or be implemented by one or more O-DUs 711, and O-CU-UP 709 may perform the aggregation and/or distribution of traffic via such DUs 603 (e.g., O-DUs 711). O-DU 711 may be communicatively coupled to one or more RUs 601, which may include and/or may be implemented by one or more O-RUs 713. In some embodiments, O-Cloud 715 may include or be implemented by one or more MECs 105, which may provide services, and may be communicatively coupled, to O-CU-CP 707, O-CU-UP 709, O-DU 711, and/or O-RU 713 (e.g., via an O1 and/or O2 interface).

Figure 8:
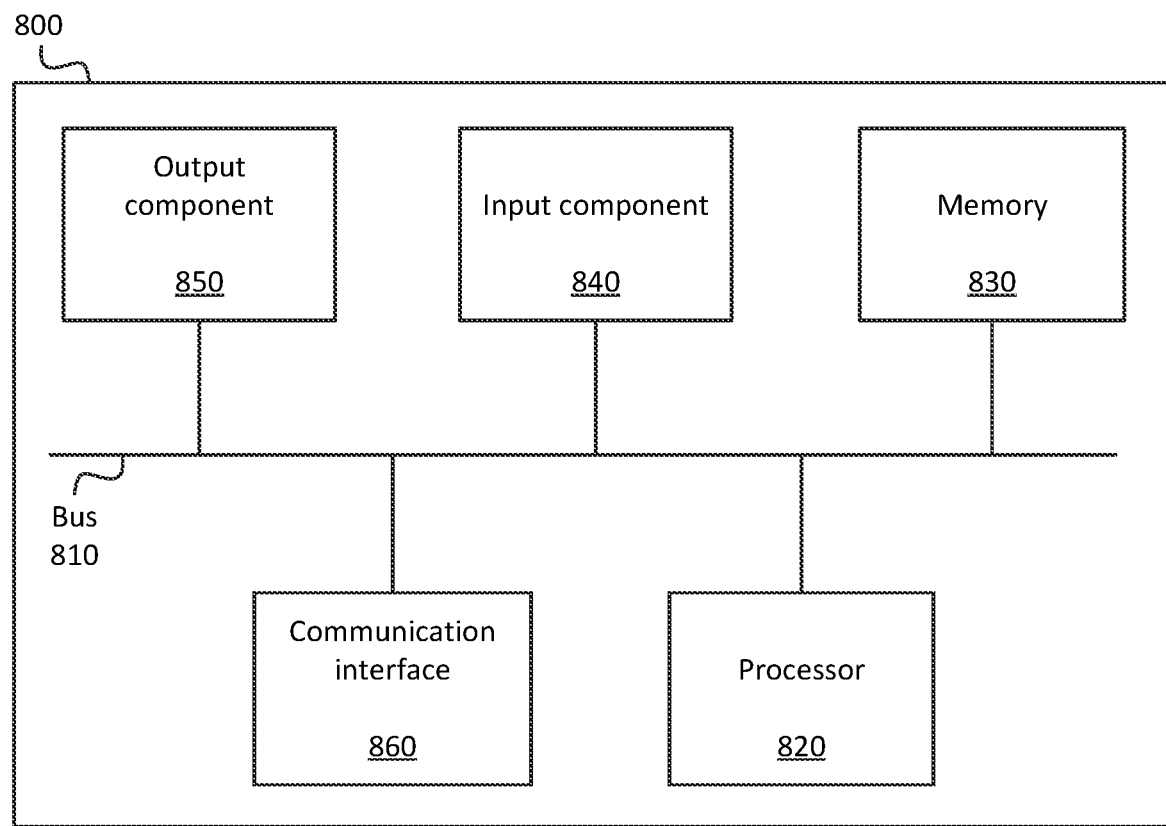
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")—based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth[200] radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
 one or more processors configured to:
  receive services associated with a set of applications from a first Multi-Access/Mobile Edge Computing device ("MEC");
  receive an indication to switch to a second MEC;
  receive context data, associated with the set of applications, from the first MEC;
  provide the context data to the second MEC; and
  receive, based on providing the context data to the second MEC, services associated with the set of applications from the second MEC.

2. The device of claim 1, wherein the indication to switch to the second MEC is based on movement of the device from a first a geographical location associated with the first MEC toward a second geographical location associated with the second MEC.

3. The device of claim 1, wherein the one or more processors are further configured to:
output a request to elevate a priority associated with receiving the context data from the first MEC, wherein one or more network devices via which the context data is provided from the first MEC prioritize the context data over other traffic based on the request to elevate the priority associated with the context data from the first MEC.

4. The device of claim 3, wherein elevating the priority associated with receiving the context data from the first MEC includes at least one of:
increasing a queue weight of the context data, relative to a queue weight associated with other traffic output by the first MEC,
increasing a queue weight of the context data, relative to a queue weight associated with other traffic output to the device, or
increasing an amount of radio frequency ("RF") resources granted to the device for transferring the context data from the first MEC.

5. The device of claim 1, wherein the one or more processors are further configured to:
output a request to elevate a priority associated with providing the context data to the second MEC, wherein one or more network devices via which the context data is provided to the second MEC prioritize the context data over other traffic based on the request to elevate the priority associated with the context data to the second MEC.

6. The device of claim 5, wherein elevating the priority associated with providing the context data to the second MEC includes at least one of:
increasing a queue weight of the context data, relative to a queue weight associated with other traffic provided to the second MEC,
increasing a queue weight of the context data, relative to a queue weight associated with other traffic output by the device, or
increasing an amount of radio frequency ("RF") resources granted to the device for transferring the context data to the second MEC.

7. The device of claim 1, wherein the one or more processors are further configured to:
receive, from the first MEC, information indicating an amount of context data associated with the set of applications; and
provide, to the second MEC, an indication of the amount of context data associated with the set of applications.

8. A non-transitory computer-readable medium, storing a plurality of processor-executable instructions to:
receive services associated with a set of applications from a first Multi-Access/Mobile Edge Computing device ("MEC");
receive an indication to switch to a second MEC;
receive context data, associated with the set of applications, from the first MEC;
provide the context data to the second MEC; and
receive, based on providing the context data to the second MEC, services associated with the set of applications from the second MEC.

9. The non-transitory computer-readable medium of claim 8, wherein the indication to switch to the second MEC is based on movement of a device executing the processor-executable instructions from a first a geographical location associated with the first MEC toward a second geographical location associated with the second MEC.

10. The non-transitory computer-readable medium of claim 8, wherein the plurality of processor-executable instructions further include processor-executable instructions to:
output a request to elevate a priority associated with receiving the context data from the first MEC, wherein one or more network devices via which the context data is provided from the first MEC prioritize the context data over other traffic based on the request to elevate the priority associated with the context data from the first MEC.

11. The non-transitory computer-readable medium of claim 10, wherein elevating the priority associated with receiving the context data from the first MEC includes at least one of:
increasing a queue weight of the context data, relative to a queue weight associated with other traffic output by the first MEC,
increasing a queue weight of the context data, relative to a queue weight associated with other traffic output to a device executing the processor-executable instructions, or
increasing an amount of radio frequency ("RF") resources granted to the device for transferring the context data from the first MEC.

12. The non-transitory computer-readable medium of claim 8, wherein the plurality of processor-executable instructions further include processor-executable instructions to:
output a request to elevate a priority associated with providing the context data to the second MEC, wherein one or more network devices via which the context data is provided to the second MEC prioritize the context data over other traffic based on the request to elevate the priority associated with the context data to the second MEC.

13. The non-transitory computer-readable medium of claim 12, wherein elevating the priority associated with providing the context data to the second MEC includes at least one of:
increasing a queue weight of the context data, relative to a queue weight associated with other traffic provided to the second MEC,
increasing a queue weight of the context data, relative to a queue weight associated with other traffic output by a device executing the processor-executable instructions, or
increasing an amount of radio frequency ("RF") resources granted to the device for transferring the context data to the second MEC.

14. The non-transitory computer-readable medium of claim 8, wherein the plurality of processor-executable instructions further include processor-executable instructions to:
receive, from the first MEC, information indicating an amount of context data associated with the set of applications; and
provide, to the second MEC, an indication of the amount of context data associated with the set of applications.

15. A method, comprising:
receiving services associated with a set of applications from a first Multi-Access/Mobile Edge Computing device ("MEC");
receiving an indication to switch to a second MEC;

receiving context data, associated with the set of applications, from the first MEC;

providing the context data to the second MEC; and receiving, based on providing the context data to the second MEC, services associated with the set of applications from the second MEC.

16. The method of claim 15, wherein the indication to switch to the second MEC is based on movement of a User Equipment ("UE"), receiving the services associated with the set of applications from the first MEC, from a first a geographical location associated with the first MEC toward a second geographical location associated with the second MEC.

17. The method of claim 15, further comprising:

outputting a request to elevate a priority associated with receiving the context data from the first MEC, wherein one or more network devices via which the context data is provided from the first MEC prioritize the context data over other traffic based on the request to elevate the priority associated with the context data from the first MEC.

18. The method of claim 17, wherein the context data is provided by the first MEC to a User Equipment ("UE"), wherein elevating the priority associated with receiving the context data from the first MEC includes at least one of:

increasing a queue weight of the context data, relative to a queue weight associated with other traffic output by the first MEC, increasing a queue weight of the context data, relative to a queue weight associated with other traffic output to the UE, or increasing an amount of radio frequency ("RF") resources granted to the UE for transferring the context data from the first MEC.

19. The method of claim 15, further comprising:

outputting a request to elevate a priority associated with providing the context data to the second MEC, wherein one or more network devices via which the context data is provided to the second MEC prioritize the context data over other traffic based on the request to elevate the priority associated with the context data to the second MEC.

20. The method of claim 19, wherein the context data is provided to the second MEC by a User Equipment ("UE"), wherein elevating the priority associated with providing the context data to the second MEC includes at least one of:

increasing a queue weight of the context data, relative to a queue weight associated with other traffic provided to the second MEC, increasing a queue weight of the context data, relative to a queue weight associated with other traffic output by the UE, or increasing an amount of radio frequency ("RF") resources granted to the UE for transferring the context data to the second MEC.

* * * * *